United States Patent [19]
Faust et al.

[11] Patent Number: 5,868,047
[45] Date of Patent: Feb. 9, 1999

[54] INSERT BIT FOR USE WITH A POWERED SCREWDRIVER

[75] Inventors: James A. Faust, Elizabethtown, Ky.; Marzell Chanton, St. Nicklaus, Switzerland; Carl A. Shumaker, Louisville, Ky.

[73] Assignee: Vermont American Corporation, Louisville, Ky.

[21] Appl. No.: 196,200

[22] PCT Filed: Jan. 26, 1994

[86] PCT No.: PCT/US94/00441

§ 371 Date: Nov. 27, 1996

§ 102(e) Date: Nov. 27, 1996

[51] Int. Cl.[6] .................................................. B25B 23/00
[52] U.S. Cl. ................................................. 81/438; 81/471
[58] Field of Search .............................. 81/436, 438, 467, 81/471, 477

[56] References Cited

FOREIGN PATENT DOCUMENTS 0336136  10/1989  European Pat. Off. .
0416099  3/1991   European Pat. Off. .

*Primary Examiner*—D. S. Meislin
*Assistant Examiner*—Joni B. Danganan
*Attorney, Agent, or Firm*—Middleton & Reutlinger; James C. Eaves, Jr.

[57] ABSTRACT

The present invention relates to the field of insert bits (10) for use with powered screwdrivers. The formed bits (10) may be treated to have a desired microstructure by either an austempering process or by the three step heating, quenching, tempering process. The bits (10) may also be electro-polished. Austempering provides for improved function and increased fatigue life and electro-polishing provides for improved function and increased fatigue life and torque capacity. The bits (10) and may have reduced diameter midportions (30), particularly for use with impact drivers.

8 Claims, 5 Drawing Sheets

FIG. 7

| TIP - TYPE & SIZE | TIP BREAK (Nm) | MIDPORTION DIAMETER (mm) | MIDPORTION BREAK (Nm) | ROTATION TIP v. SHANK(°) |
|---|---|---|---|---|
| Cross-point P-2 | 16.9 | 3.80-3.91 | 20.3-22.0 | 18.8 |
| Cross-point P-3 | 49.7 | 5.48-5.59 | 61.0-63.3 | 15.3 |
| "POZIDRIV" PZ-2 | 15.8 | 3.75-3.86 | 19.0-21.2 | 19.9 |
| SLOTTED 1.2x6.5 mm | 13.1 | 3.55-3.66 | 15.8-18.1 | 16.0 |
| Hex 4 mm | 28.2 | 4.52-4.63 | 33.9-36.2 | 18.7 |
| Hex 5 mm | 56.5 | 5.71-5.82 | 67.8-71.2 | 14.0 |
| "TORX" T-25 | 16.0 | 4.01-4.12 | 22.6-24.9 | 17.8 |
| "TORX" T-27 | 24.1 | 4.45-4.56 | 31.6-33.9 | 15.1 |
| "TORX" T-30 | 30.6 | 4.97-5.08 | 45.2-47.5 | 16.8 |
| "TORX" T-40 | 55.4 | 5.99-6.10 | 79.1-82.5 | 17.5 |

INSERT BIT FOR USE WITH A POWERED SCREWDRIVER

TECHNICAL FIELD

The present invention relates to the field of insert bits for use with powered screwdrivers. The bits may be austempered for improved function and increased fatigue life and/or electro-polished for improved function and increased fatigue life and torque capacity and may have reduced diameter midportions, particularly for use with impact drivers.

BACKGROUND ART

Conventional powered screwdrivers and impact drivers are known. These drivers receive an insert bit having the desired tip and are used to insert or remove screws. The conventional powered screwdrivers are similar in operation to an electric drill, in that they exert a continuous rotational force onto the bit inserted therein. Typically, the impact drivers function similarly at low torque, but above a predefined torque, instead of a continuous torque, the impact driver assert a series of impacts onto the insert bit. For example, known impact drivers can assert as many as 2800 impacts per minute onto the insert bit being used. In situations requiring high torque, such as inserting a screw into a hard lumber without having drilled a guide hole, impact drivers are able to insert or remove a screw better than conventional powered screwdrivers. Known impact drivers can set a screw so that it takes a torque of, for example, from 30 to 300 Newton-meters ("Nm") to move the screw from the set position.

It is known to austemper insert bits of tool steel to improve resistance to fatigue. Austempering produces bits having a microstructure of bainite. The insert bits are heated to a temperature above 723° C. so that the steel is first austenitized. Then, the steel is cooled to a temperature above the martensite start temperature, for example, around 300° C., and held at that temperature for a desired time to permit the transformation to bainite. No tempering is required. Austempering helps to reduce distortion or cracking during cooling and produces a tool having improved toughness, when compared to tempered martensite at the same Rockwell C hardness ("HRC").

Electro-polishing is a known process wherein a chemicals and electrical current are used to remove surface imperfections. Known uses are in the medical, automotive, food service, and electronics industries. However, electro-polishing of tools, such as impact bits of the present invention is not known to the inventors.

European Patent Office Granted Specification No. 89 104 239 (EPO Application No. 0 336 136) teaches in claim 1 a screwdriver bit with terminal drive region for insertion in a machine chuck, an intermediate section and a power region having a screwdriver tip (7) which has driving ribs (8) arranged uniformly over the periphery for engagement in cross-slotted screws, the apices (8') of which driving ribs (8) project radially beyond the cross-section of the intermediate section (10), characterized in that the intermediate section has a twistable zone, the ratio of diameter to length of the intermediate section (10) having constant cross-section is less than 0.5 and greater than 0.2 and the torsion modulus of the twistable zone T is such that the restoring angle resulting from the resilient recovery power of the intermediate section (10) to reach the torque leading to plastic deformation/break is 3.5 to 8 degrees.

DISCLOSURE OF INVENTION

The present invention relates to insert bits for use with powered screwdrivers. The bits may be formed by any number of manufacturing methods, for example, forging or milling. The formed bits may be austempered for improved function and increased fatigue life and/or electro-polished for improved function and increased fatigue life and torque capability and may have reduced diameter midportions, particularly for use with impact drivers.

More particularly, the present invention is for an insert bit having a shank end insertable into a driver; a tip end being breakable at a first torque; and, a midportion located between the shank end and the tip end, the midportion being breakable at a second torque; characterized in that the midportion is sized so that the second torque has a value approximately 20% greater than the first torque, the midportion having a preselected length of from approximately 18 mm to 23.5 mm and the midportion having a preselected diameter of from approximately 3.55 mm to approximately 6.35 mm, where the midportion preselected length and diameter are selected to permit the shank end to be rotated at least 14 degrees with respect to the tip end without permanent deformation of the impact bit. The present invention includes austempering the bit for a desired hardness of from 52–56 HRC. The bit and method of making also may include electro-polishing the insert bit for a desired surface roughness of less than 0.7 micrometer and a maximum surface roughness not exceeding 1.0 micrometer.

BRIEF DESCRIPTION OF DRAWINGS

A better understanding of the present invention will be had upon reference to the following description in conjunction with the accompanying drawings wherein:

FIG. 7 is a table listing the measured tip break torque and the measured tip versus shank relative rotation without permanent insert bit deformation, as well as the calculated midportion diameter and break torque, for selected tip types and sizes; and, FIG. 8A depicts a greatly magnified cross-section view of a slotted tip without electro-polishing

MODES FOR CARRYING OUT THE INVENTION AND INDUSTRIAL APPLICABILITY

Figure 1:
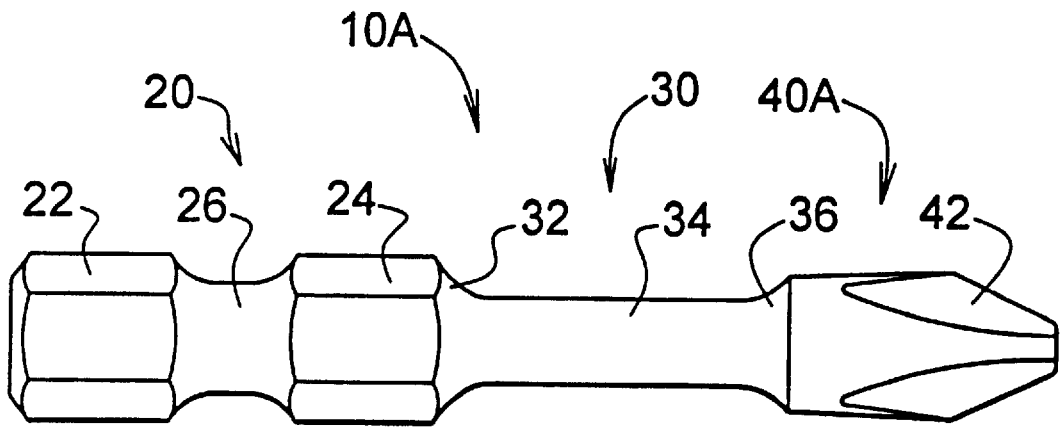
FIG. 1 is a side view of an impact bit embodying the present invention, the impact bit having a phillips or cross-point tip.

With reference to FIGS. 1–5, there are shown impact bits (10A–E) having various desired tips 40A–E, cross-point, "POZIDRIV", hex, "TORX", and slotted, respectively, although other tip geometries can be employed. With reference to FIG. 1, an impact bit 10A is shown having a shank end 20, a reduced diameter midportion 30, and a tip 40A. Shank end 20 has a pair of hex portions 22 and 24 separated by an indented power groove portion 26.

A power screwdriver insert bit may only have a hex portion, such as portion 22, for insertion into the tool or could include a power groove 26. A bit used with an impact driver may have a power groove portion 26 between hex portions 22 and 24 to secure the bit 10 within the impact driver. Other shank shapes may be employed for other applications.

The tip 40A has a plurality of cross-point-type wings 42. As will be explained hereinafter, the midportion 30 is sized so that it can withstand approximately 20% more torque than the tip 40A. As shown, midportion has a tapering transition 32 and 36 at its two ends.

As shown, bit 10A is 49 mm in length, the shank end 20 is 19 mm and the midportion is 18 mm, for example. These and later dimensions are only examples, not limiting the scope of the instant invention. The shank end 20/midportion 30 transition 32 will be determined by the midportion 30 diameter which is affected by the tip torque capacity. The midportion 30/tip 40 transition 36 will be determined by the tip 40 size and midportion 30 diameter.

Figure 2:
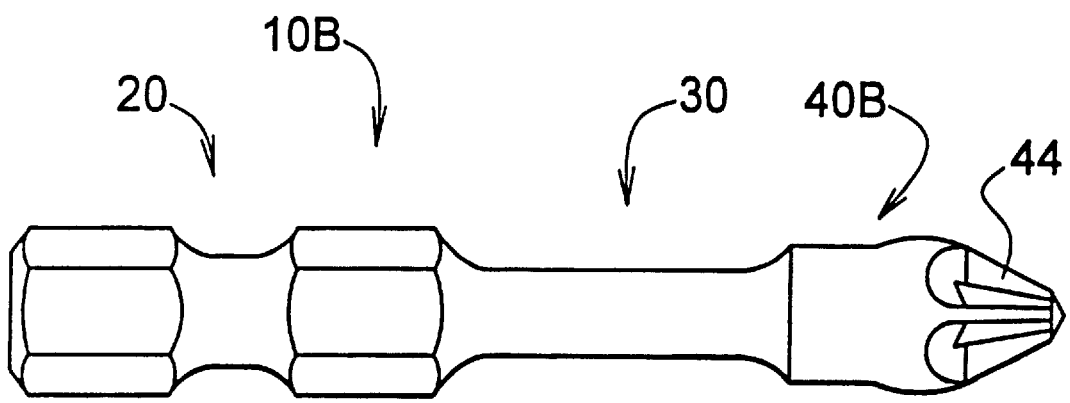
FIG. 2 is a side view of an impact bit embodying the present invention, the impact bit having a "POZIDRIV" tip ("POZIDRIV" is a trademark registered in the United States by the Phillips Screw Company, Inc. of East Boston, Mass., e.g. R0707177)

FIG. 2 shows an insert bit 10B having a "POZIDRIV" tip 40B. "POZIDRIV" tip 40B is similar to cross-point tip 40A of FIG. 1. However, it's "POZIDRIV" wings 44 have a different geometry from the wings 42 of FIG. 1. This different geometry helps retain the bit 10B within a "POZIDRIV" screw, thereby reducing cam-out.

Figure 3:
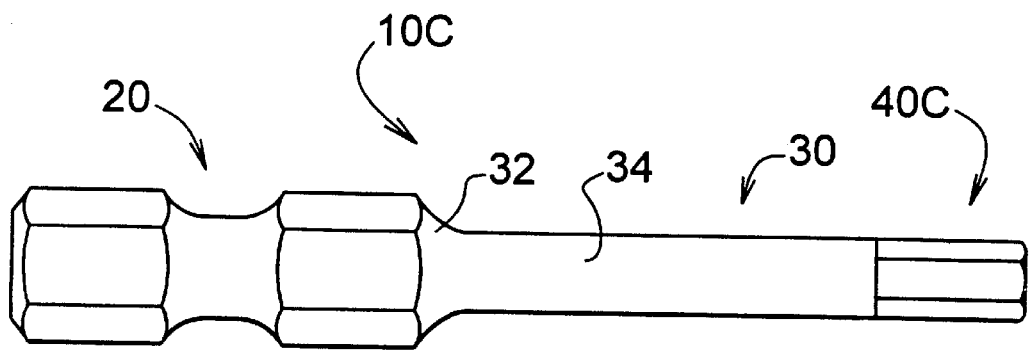
FIG. 3 is a side view of an impact bit embodying the present invention, the impact bit having a hex-type tip.
Figure 4:
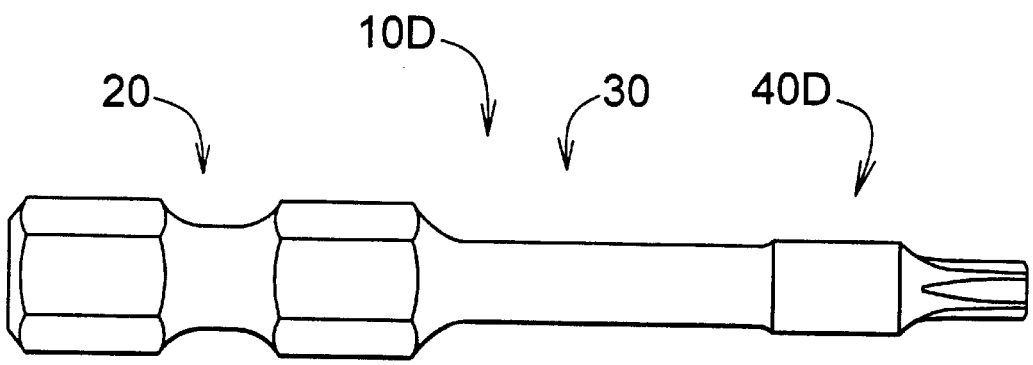
FIG. 4 is a side view of an impact bit embodying the present invention, the impact bit having a "TORX"-type tip ("TORX" is a trademark registered in the United States by the TEXTRON, Inc. of Rockford, Ill., doing business as the CAMCAR Screw & Manufacturing Co., e.g. R1040018 & R1153676)

FIG. 3 shows an insert bit 10C having a hex tip 40C. FIG. 4 shows an insert bit 10D having a "TORX" tip 40D. "TORX" tip 40D is similar to hex tip 40C in that the tips are both six sided. However, the hex tip 40C, when viewed from the end is of hexagonal shape and the "TORX" tip 40D has inward curved portions between its six points.

The bits 10A, 10B, 10C, and 10D are envisioned to have the same Overall length (49 mm) and the same shank 20 length (19 mm), for example. The bits 10A, 10B, and 10D are shown having the same midportion 30 length (18 mm), for example. In the hex bit 10C, the midportion 30 extends from the shank 20 to the tip 40, a length of 24.5 mm, for example. Therefore, in the hex bit 10C, transition 32 exists between the shank 20 and the reduced diameter portion 34 of midportion 30, but transition 36, such as in the other bits shown, does not exist in bit 10C.

Figure 5:
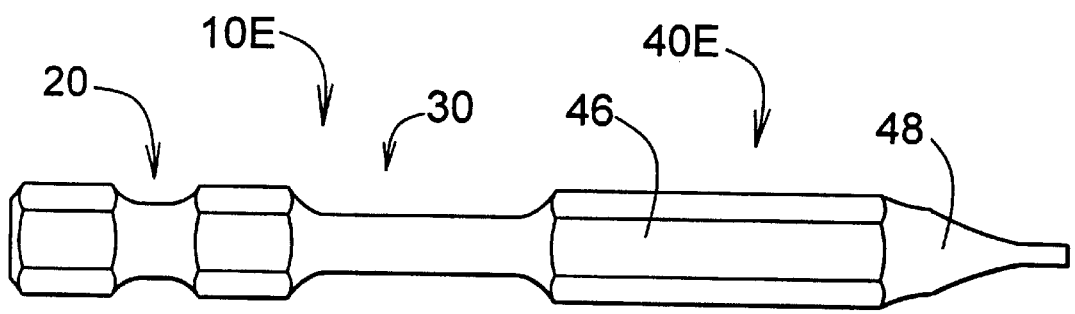
FIG. 5 is a side view of an impact bit embodying the present invention, the impact bit having a tip for slotted screws.

The bit 10E of FIG. 5 is for use with slotted screws and has a different tip 40E geometry. While it is envisioned that bit 10E will have the same shank 20 length and the same midportion 30 length as bits 10A–B and 10D, the tip portion 40E will be longer, for example, 33 mm, and, therefore, the overall bit 10E length will be longer, for example, 70 mm.

Tip 40E includes a slotted tip portion 48 and a hex portion 46 between tip portion 48 and midportion 30. For example, the hex portion may be 20 mm long and the slotted tip portion may be 13 mm long, adding to 33 mm. The hex portion 46 permits the use of a screw finder when using an impact driver. Without the use of a screw finder with slotted screws, the insert bit has a tendency to jump out of a slotted screw slot. The slotted screw tip portion 48 may be formed, for example by milling or forging.

The bits 10A–E of FIGS. 1–5 are specifically designed so that the bit tips 40A–E will be the "weakest" portion and, therefore, be the portion of the bit which fails first if the bit is overtorqued. As was previously mentioned, the impact drivers function similarly at low torque, but above a predefined torque, instead of a continuous torque, the impact driver assert a series of impacts onto the insert bit. For example, up to 2800 impacts per minute may be asserted onto the bit. The midportion 30 is engineered so that it can take approximately 20% more torque than the tip. By sizing the midportion 30 for this torque, the midportion 30 provides a dampening function for the impacts asserted onto the bit.

Figure 6:
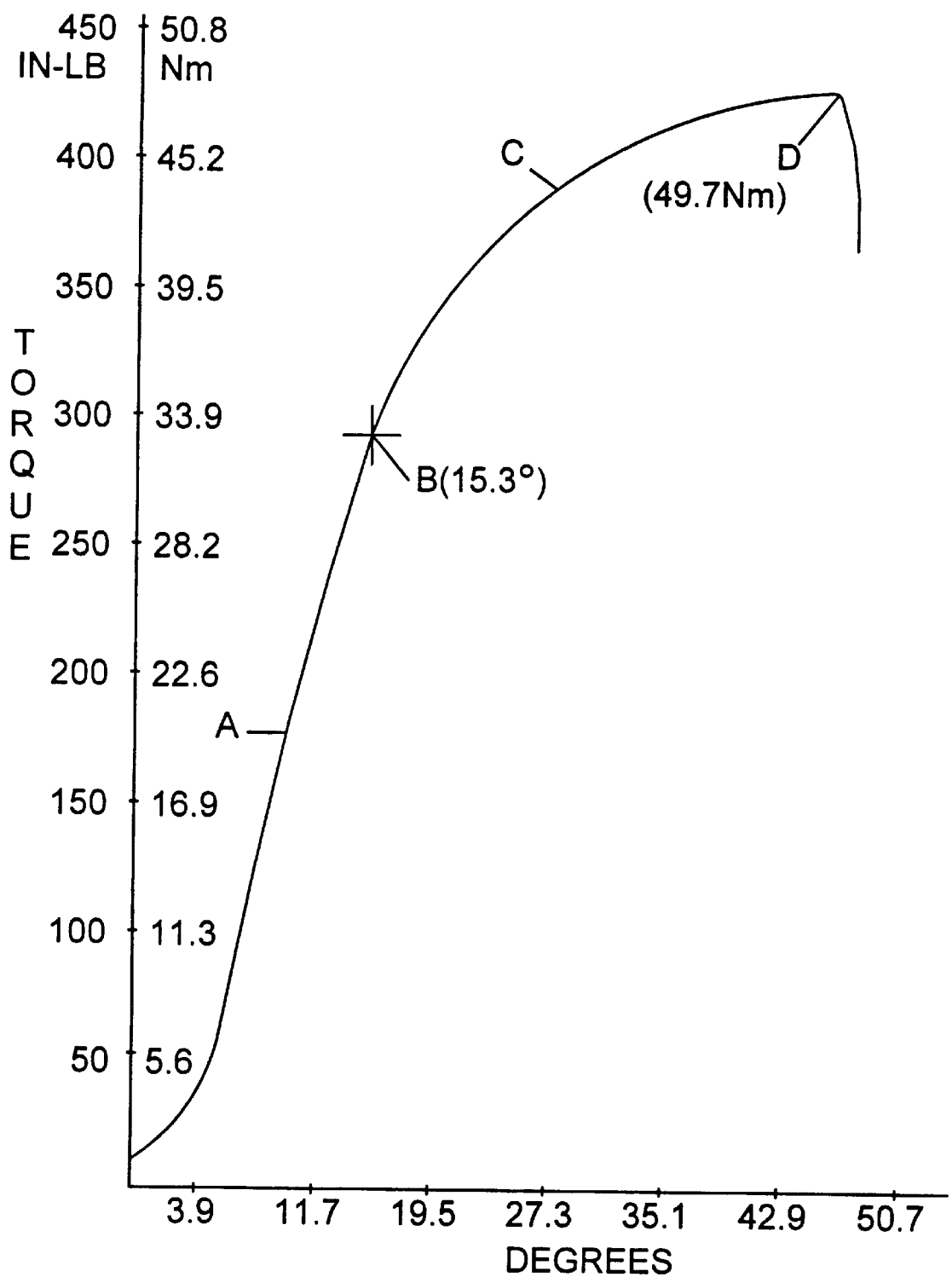
FIG. 6 is a graphical representation of the torque forces being applied to a Cross-point P-3 tip until the tip breaks.

FIG. 6 shows a graph of a torque curve for a cross-point type impact bit having a P3 size tip, the bit being austempered and having a hardness of 53–55 HRC. The "y-axis" provides the torque applied to the bit in inch-pounds or Newton-meters ("NM"). The "x-axis" provides the rotation in degrees of the tip 40 relative to the shank 20. The portion of the curve identified by the letter "A" is the bit elastic region. In this elastic region, the bit can have its shank twisted a number of degrees, for example 10°, relative to its tip without permanent deformation. The point identified by the letter "B". is the elastic point, in this case 15.3°, the point after which permanent bit deformation will occur. The portion of the curve identified by the letter "C" is the bit plastic or permanent deformation region. The point identified by the letter "D" is the point at which the tip breaks. In this case, the P3 bit tip breaks when subjected to a torque of 49.7 Nm.

FIG. 7 is a chart which details, for a selected plurality of possible austempered impact bits having a hardness of 53–55 HRC, the shown measured data. The bits have the physical dimensions given as examples in the above discussion of FIGS. 1–5. For the various impact bits, the data shows the torque required for the tip to break, the range of midportion diameters, the range of torques required to break the midportion, and the elastic point.

Austempering the impact bits improves their fatigue life when compared to bits produced by conventional quench and temper methods having a similar hardness. This is particularly important with the impact bits being subjected to the approximate 2800 impacts per minute. As bits generally fail by point fracture of their tips, the bainitic microstructure resulting from austempering reduces the chances of fatigue cracking. Various bits can be measured for the number of times a bit can screw a P-2 cross-point screw into an oak block before bit failure. For example, at a 95% confidence level, an austempered bit having a hardness of 56.0 HRC can screw in 156 screws before failing while a quenched and tempered bit with tempered martensite microstructure having a hardness of 64.0 HRC can only screw in 54 screws before failing.

When testing per the ASTM standard E1304 (plane strain (chevron-notch) fracture toughness of metallic materials test), and comparing the fracture initiation load for an austempered bit and a quench and tempered bit, both having a hardness of from 54–56 HRC, the austempered bit takes more than twice the load than the quench and tempered bit before fracture initiation. Also, the load required for crack propagation in an austempered bit is higher than in a quench and tempered bit.

Measured data for quench and tempered bits shows a fracture initiation load occurring from 1,334 to 1,780 Newtons (300 to 400 pounds); while measured data for austempered bits shows a fracture initiation load occurring from 2,670 to 4,000 Newtons (600 to 900 pounds). When looking at crack propagation, data for quench and tempered bits shows a critical stress intensity factor measurement of between 20.4 and 22.4 Megapascals per root meter ("MPa√m"); while data for austempered bits shows a critical stress intensity factor measurement of between 30.8 and 35.2 Megapascals per root meter.

Figure 8A:
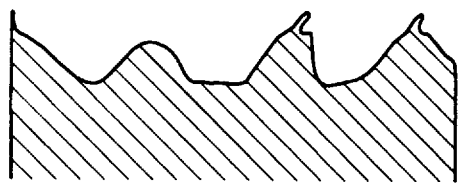
FIG. 8B depicts a greatly magnified cross-section view of a slotted tip with electro-polishing.
Figure 8B:
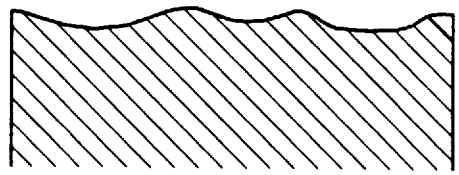

FIG. 8A depicts a greatly magnified cross-section profile of a tip of a slotted bit, for example having a surface roughness of 1.65 micrometers ("μm"). With electro-polishing, FIG. 8B depicts the same bit having a surface roughness of 0.66 μm. It is believed that the removal of the mechanically damaged surface of the bits by electro-polishing retards fatigue crack initiation. Also, tests have demonstrated that electro-polishing increases the torsional fracture strength properties of bits. While a bit can be completely microsmoothed, it is believed that electro-polishing to achieve at least a 50% reduction in the initial surface roughness can significantly improve bit fatigue life and can increase the torque the bit tip can withstand. Other microsmoothing or surface polishing techniques may be employed to achieve similar improvements.

For example, "POZIDRIV" austempered bits having a PZ-2 tip and a hardness of from 53–55 HRC were tested for torque and tool life. The austempered only bits had an average torque at tip break of 149.3 inch-pounds or 16.9 Nm, while the austempered and electro-polished bits had an average torque at tip break of 157.3 inch-pounds or 17.8 Nm. When comparing the tool life of an austempered only bit to an austempered and electro-polished bit, on average, the austempered and electro-polished bits should be able to screw in about 70% more screws before failing than the austempered only bits. This increase was a great surprise to the inventors. Electro-polishing provides other benefits. For example, the bit has a bright finish, which is attractive to some, and the electro-polished bits are more resistant to corrosion.

The foregoing detailed description is given primarily for clearness of understanding and no unnecessary limitations should be understood therefrom for modifications will become obvious to those skilled in the art upon reading this disclosure and may be made without departing from the spirit of the invention or scope of the appended claims.

We claim:

1. An insert bit (10) comprising:

(a.) a shank end (20) insertable into a driver;

(b.) a tip end (40), said tip end (40) being breakable at a first torque; and (c.) a midportion (30) located between said shank end and said tip end, said midportion (30) being breakable at a second torque;

characterized in that:

(d.) said midportion (30) is sized so that said second torque has a value approximately 20% greater than said first torque;

(e.) said midportion (30) has a preselected length and a preselected diameter, said midportion (30) preselected length has a value of from approximately 18 mm to 23.5 mm and said midportion (30) preselected diameter has a value of from approximately 3.55 mm to approximately 6.35 mm, said midportion (30) preselected length and preselected diameter selected to permit said shank end (20) to be rotated at least 14 degrees with respect to said tip end (40) without permanent deformation of said impact bit (10); and, (f.) said insert bit (10) is austempered and has a desired hardness of from 52–56 HRC.

2. The insert bit of claim 1, characterized in that said austempered insert bit (10) has a desired fracture initiation load value and a desired critical stress intensity factor measurement value, where said desired fracture initiation load value is at least 2,670 Newtons and said desired critical stress intensity factor measurement value is at least 30.8 Megapascals per root meter.

3. The insert bit (10) of claim 2, where said insert bit (10) is electro-polished so that said tip end (40) of said insert bit (10) has a surface roughness, said surface roughness not exceeding 1.0 micrometer.

4. The insert bit (10) of claim 3, characterized in that the electro-polishing reduces the initial non-electro-polished surface roughness by at least 50% at said tip end (40).

5. The insert bit of claim 3, where said surface roughness is less than 0.7 micrometer.

6. The insert bit (10) of claim 1, where said insert bit (10) is electro-polished so that said tip end (40) of said insert bit (10) has a surface roughness said surface roughness not exceeding 1.0 micrometer.

7. The insert bit (10) of claim 6, characterized in that the electro-polishing reduces the initial non-electro-polished surface roughness by at least 50% at said tip end (40).

8. The insert bit of claim 6, where said surface roughness is less than 0.7 micrometer.

* * * * *